(12) United States Patent
Ito (10) Patent No.: US 9,134,589 B2
(45) Date of Patent: Sep. 15, 2015

(54) LENS BARREL

(71) Applicant: Panasonic Corporation, Osaka (JP)

(72) Inventor: Daisuke Ito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/285,360

(22) Filed: May 22, 2014

(65) Prior Publication Data

US 2014/0376103 A1 Dec. 25, 2014

(30) Foreign Application Priority Data

Jun. 21, 2013 (JP) .................................. 2013-130168
May 14, 2014 (JP) .................................. 2014-100085

(51) Int. Cl.
*G02B 15/14* (2006.01)
*G02B 7/02* (2006.01)
*G03B 17/00* (2006.01)
*G02B 7/10* (2006.01)

(52) U.S. Cl.
CPC ................. *G03B 17/00* (2013.01); *G02B 7/102* (2013.01)

(58) Field of Classification Search
USPC ......... 359/700, 704, 815, 811, 822–824, 826, 359/827, 813, 819
See application file for complete search history.

(56) References Cited

U.S. PATENT DOCUMENTS

2005/0185950 A1* 8/2005 Omiya et al. .................. 396/349
2010/0290770 A1* 11/2010 Ishizuka et al. .................. 396/55

FOREIGN PATENT DOCUMENTS

JP 08-271778 A 10/1996
JP 2005-275353 A 10/2005

* cited by examiner

*Primary Examiner* — Joseph P Martinez
*Assistant Examiner* — Brandi Thomas
(74) *Attorney, Agent, or Firm* — Renner, Otto, Boisselle & Sklar, LLP (57) ABSTRACT

This disclosure provides a lens barrel which can realize miniaturization thereof in a radial direction even when a drive part such as an actuator is disposed inside the lens barrel. The lens barrel according to this disclosure receives light from a subject and forms an image by a lens system. The lens barrel includes a fixed frame, a cam frame disposed on an inner peripheral side of the fixed frame and having at least one cam groove, a movable frame including a cam pin which engages with the cam groove of the cam frame and movable in an optical axis direction of the lens system, and a drive part engaging with the cam frame at an end portion of the cam frame, rotatably driving the cam frame, and being disposed at a position where the drive part and the cam frame are arranged in the optical axis direction.

4 Claims, 8 Drawing Sheets

LENS BARREL

BACKGROUND

1. Technical Field

This disclosure relates to a lens barrel which is used for an interchangeable lens or the like.

2. Description of the Related Art

Unexamined Japanese Patent Publication No. 8-271778 (Patent Literature 1) discloses a technique for realizing miniaturization of a lens barrel in an optical axis direction. Patent Literature 1 discloses the technique in which an output gear is made short for realizing the miniaturization of the lens barrel in the optical axis direction.

In the lens barrel, not only the miniaturization in the optical axis direction but also miniaturization in a radial direction (reduction of diameter) is required.

SUMMARY

This disclosure therefore provides a lens barrel which can realize miniaturization of the lens barrel in a radial direction even when a drive part such as an actuator is disposed inside the lens barrel.

The lens barrel according this disclosure receives light from a subject and forms an image by a lens system. The lens barrel includes a fixed frame, a cam frame disposed on an inner peripheral side of the fixed frame and having at least one cam groove, a movable frame including a cam pin which engages with the cam groove of the cam frame and movable in an optical axis direction of the lens system, and a drive part engaging with the cam frame at an end portion of the cam frame, rotatably driving the cam frame, and being disposed at a position where the drive part and the cam frame are arranged in the optical axis direction.

In the lens barrel according to this disclosure, the cam frame and the drive part are disposed at positions where they are arranged in the optical axis direction. Hence, the miniaturization of the lens barrel in the radial direction can be realized.

DETAILED DESCRIPTION OF THE PREFERRED EMBODIMENTS

Hereinafter, embodiments will be described in detail with reference to the drawings as appropriate. However, detailed description more than necessary may be omitted. For example, the detailed description of well-known matters or repeated description of substantially the same configuration may be omitted. This is for preventing the following description from being unnecessarily redundant, thus facilitating the understanding by those skilled in the art.

Inventors of this disclosure provide the attached drawings and the following description for enabling those skilled in the art to sufficiently understand this disclosure, and the subject matters defined in the claims are not intended to be restricted by the attached drawings and the following description.

First Embodiment

Hereinafter, a first embodiment will be described with reference to FIGS. 1 to 8.

Figure 1:
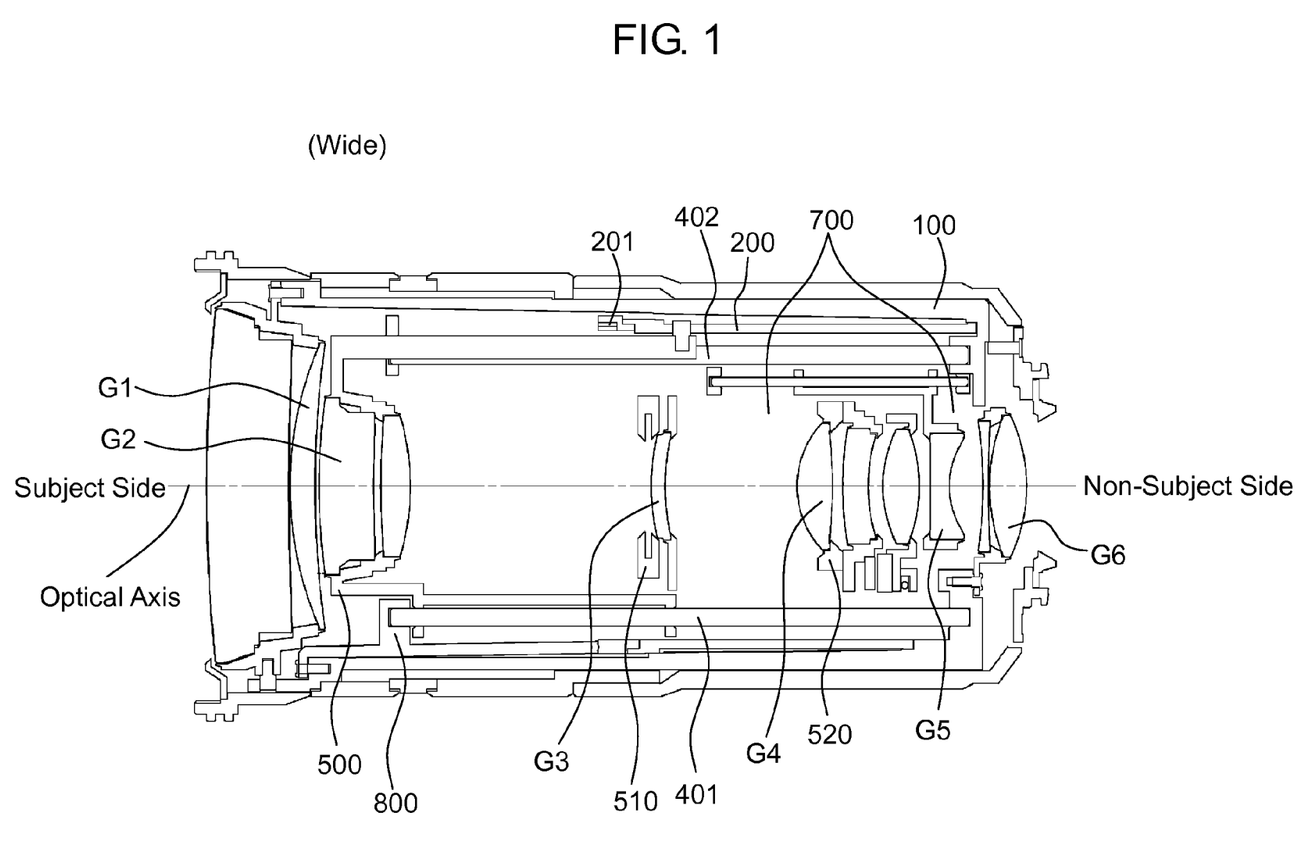
FIG. 1 is an explanatory view showing a Wide (wide angle) state of an interchangeable lens in a first embodiment.
Figure 2:
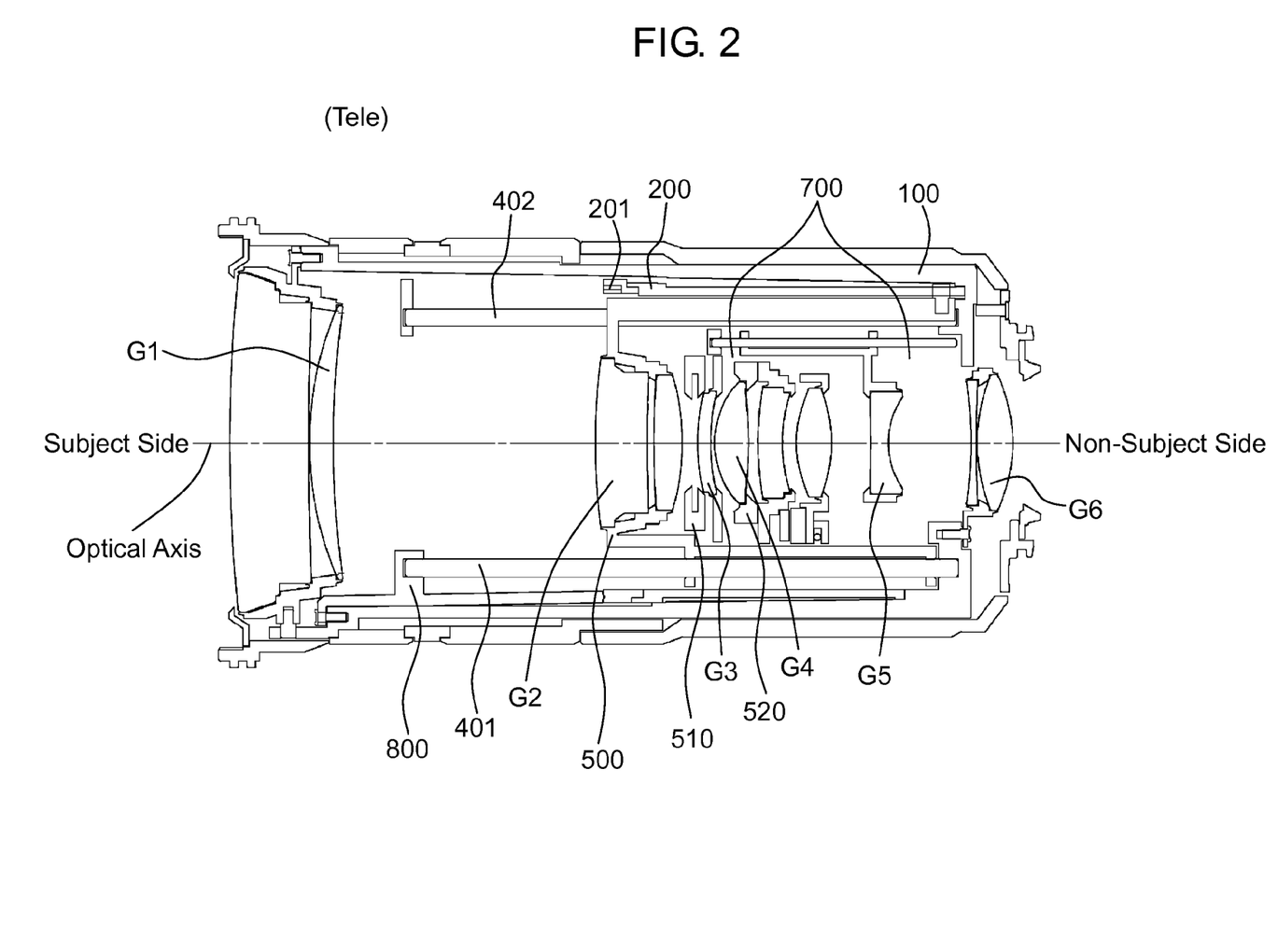
FIG. 2 is an explanatory view showing a Tele (telephoto) state of the interchangeable lens in the first embodiment.

FIG. 1 shows a Wide state of an interchangeable lens. FIG. 2 shows a Tele state of the interchangeable lens. The interchangeable lens includes first lens group G1 to sixth lens group G6. First lens group G1 and sixth lens group G6 are supported on fixed frame 100 by way of a member. Second lens group G2 is held by second lens unit 500, third lens group G3 is held by third lens unit 510, fourth lens group G4 is held by fourth lens unit 520, and fifth lens group G5 is held by focus unit 700. Second lens unit 500, third lens unit 510, fourth lens unit 520, and focus unit 700 are supported on guide shafts 401, 402 in a state where these units are respectively movable in the optical axis direction.

End portions of guide shafts 401, 402 on a non-subject side are press-fitted into and fixed to a bottom portion of fixed frame 100. Guide shafts 401, 402 are disposed on an inner peripheral side of cam barrel 200. End portions of guide shafts 401, 402 on a subject side are supported on holding frame 800. Guide shafts 401, 402 are supported on fixed frame 100 and holding frame 800 substantially parallel to an optical axis.

Cam barrel 200 is mounted on an inner peripheral side of fixed frame 100. Cam barrel 200 includes, on outer peripheral sides of both end portions, a projection which fits with fixed frame 100 in the radial direction. That is, a diameter of an outer peripheral surface of the projection of cam barrel 200 and a diameter of the inner peripheral surface of fixed frame 100 substantially agree with each other, and hence, cam barrel 200 is held inside fixed frame 100. With such a configuration, an outer periphery of cam barrel 200 fits with the inner periphery of fixed frame 100 and hence, a position of cam barrel 200 in the direction orthogonal to the optical axis is restricted. Further, cam barrel 200 is rotatably supported on the inner peripheral side of fixed frame 100 about the optical axis. The projection of cam barrel 200 may be formed not only on both end portions of cam barrel 200 but also a portion of cam barrel 200 between both end portions.

Internal gear 201 is formed on the inner peripheral side of the end portion of cam barrel 200 on the subject side. An end portion of cam barrel 200 on a side away from a subject (hereinafter referred to as "non-subject side") is brought into contact with fixed frame 100. On the other hand, the end portion of cam barrel 200 on the subject side is brought into contact with holding frame 800. Since holding frame 800 is mounted on fixed frame 100, the position of cam barrel 200 in the optical axis direction is restricted by fixed frame 100 and holding frame 800. Cam barrel 200 is one example of a cam frame.

Second lens unit 500, third lens unit 510, and fourth lens unit 520 respectively engages with the cam grooves of cam barrel 200. Accordingly, when cam barrel 200 is rotatably driven about the optical axis, second lens unit 500, third lens unit 510, and fourth lens unit 520 receive a drive force from cam barrel 200 and move in the optical axis direction.

Fifth lens group G5 illustrated on the non-subject side of FIG. 1 is a focus lens group. The focus lens group is held by focus unit 700. The configuration of focus unit 700 will be described later.

Figure 3:
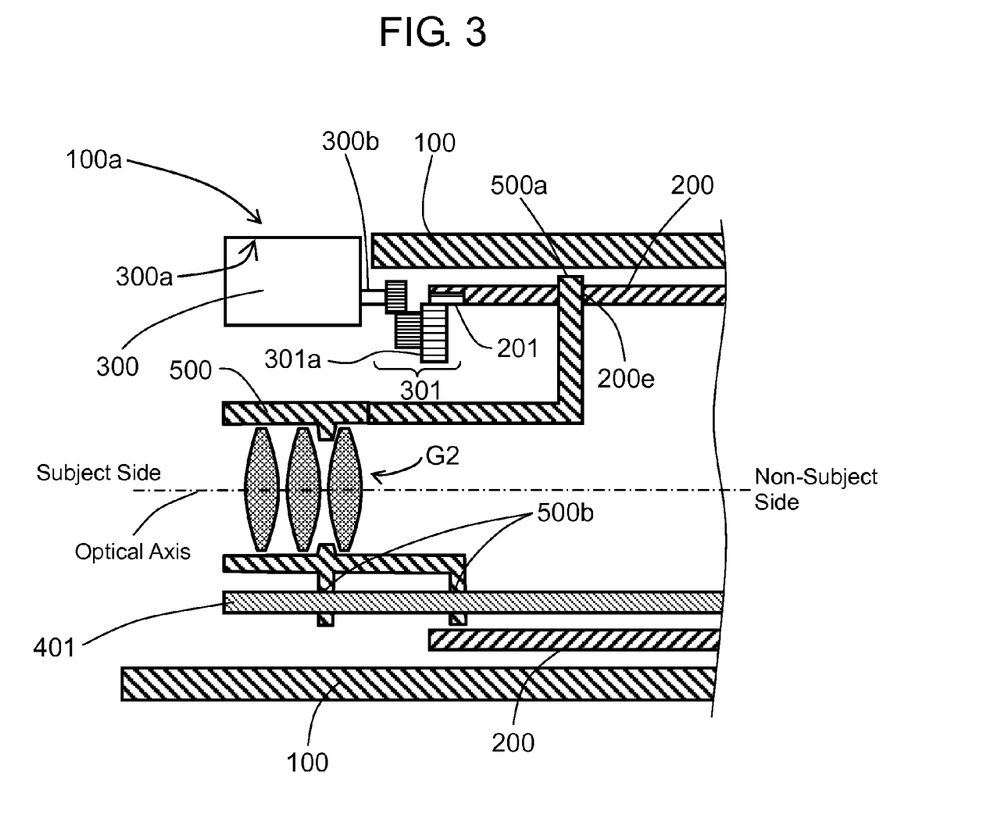
FIG. 3 is a schematic view showing a drive configuration of a second lens unit in the first embodiment.

FIG. 3 is a schematic view showing the drive configuration of the second lens unit. Fixed frame 100 has a barrel portion and a bottom portion which is connected to the barrel portion on the non-subject side, and is formed into a cylindrical shape. Fixed frame 100 has cut-out portion 100a on a side closer to the subject side than cam barrel 200. Cut-out portion 100a has a shape where a portion of fixed frame 100 on the subject side is cut away in a U shape. Zoom motor 300 is disposed in cut-out portion 100a.

Zoom motor 300 is mounted on fixed frame 100. Deceleration mechanism 301 configured by a plurality of gears is mounted on an output portion of zoom motor 300. An output gear of deceleration mechanism 301 engages with internal gear 201 of cam barrel 200, and transmits a drive force of zoom motor 300 to cam barrel 200. With such a configuration, cam barrel 200 is rotatably driven about the optical axis. Zoom motor 300 is one example of a drive part, and deceleration mechanism 301 is one example of a gear mechanism.

Zoom motor 300 is disposed such that output shaft 300b of zoom motor 300 becomes substantially parallel to the optical axis. Deceleration mechanism 301 configured by a plurality of gears such as worm gears and spur gears is mounted on output shaft 300b of zoom motor 300. Deceleration mechanism 301 is positioned on the non-subject side of zoom motor 300, and is mounted on output shaft 300b of zoom motor 300. Zoom motor 300 is disposed in cut-out portion 100a of fixed frame 100, and is mounted on fixed frame 100 by small screws or the like.

Output gear 301a of deceleration mechanism 301 engages with internal gear 201 on the inner peripheral side of cam barrel 200. Here, the gears other than output gear 301a of deceleration mechanism 301 are disposed closer to the subject side than cam barrel 200, and are disposed at a position where the gears and cam barrel 200 are arranged in the optical axis direction. Some of gears other than output gear 301a of deceleration mechanism 301 are provided at a position where some of gears overlap with cam barrel 200 when projected in the optical axis direction.

Zoom motor 300 is provided closer to the subject side than cam barrel 200, and is disposed at a position where zoom motor 300 and cam barrel 200 are arranged in the optical axis direction. A portion of zoom motor 300 is provided at a position where the portion overlaps with cam barrel 200 when projected in the optical axis direction.

A portion of zoom motor 300 is provided at a position where the portion overlaps with fixed frame 100 when projected in the optical axis direction. It is preferable that a distance between the optical axis and outer peripheral end 300a which is a portion of zoom motor 300 farthest from the optical axis is substantially equal to a radius of fixed frame 100.

Figure 4:
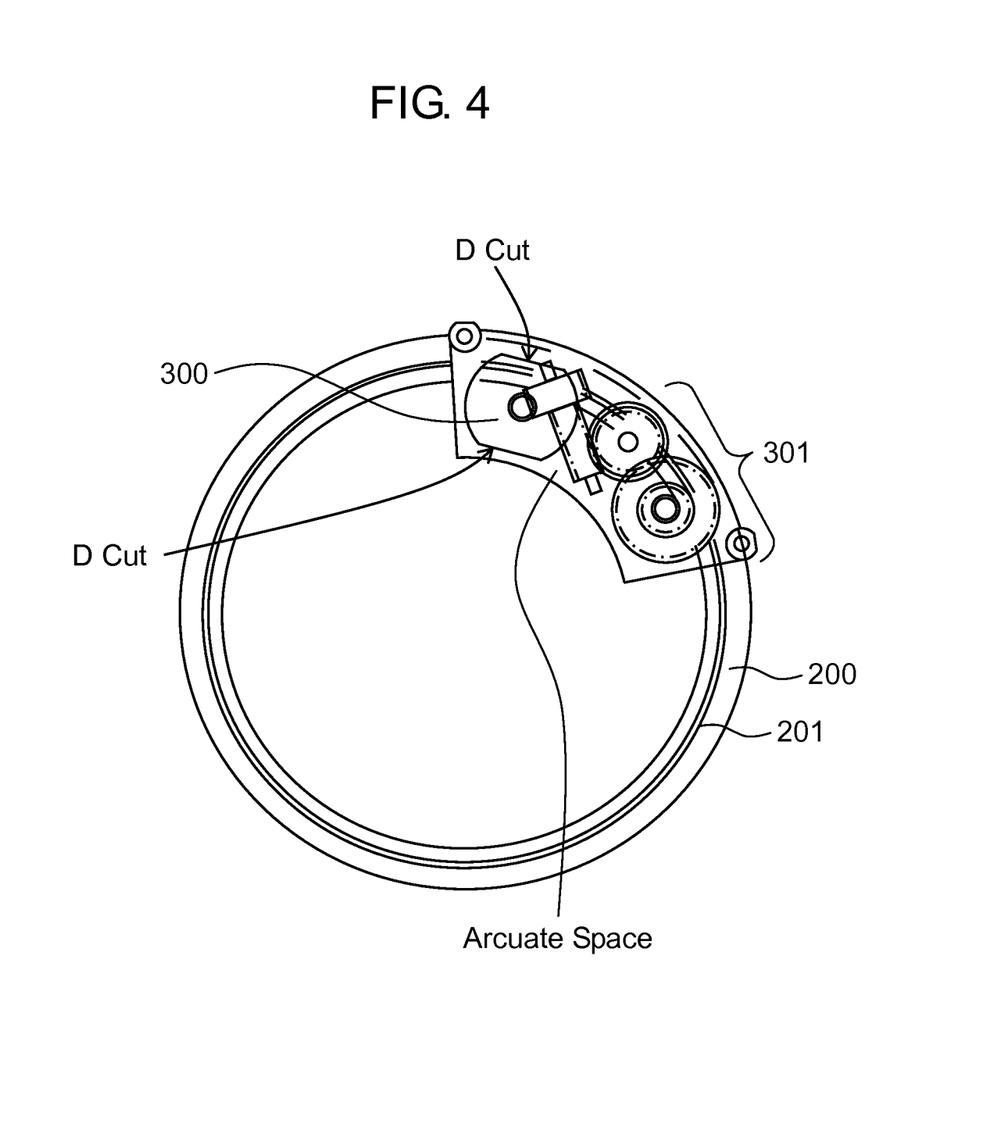
FIG. 4 is a schematic view showing an arrangement of a zoom motor and a deceleration mechanism in the first embodiment.

FIG. 4 is a schematic view showing the arrangement of zoom motor 300 and deceleration mechanism 301. Zoom motor 300 has a substantially circular cylindrical shape or a shape obtained by cutting a circular cylindrical shape in a D shape at two portions. As shown in FIG. 4, in the first embodiment, the shape obtained by cutting the circular cylindrical shape in a D shape at two portions is adopted, and a D-cut surface extends in the normal direction of the optical axis. By forming zoom motor 300 into a shape obtained by cutting a circular cylindrical shape in a D shape at two portions, a width size of the drive part in the radial direction can be suppressed. Further, as shown in FIG. 4, deceleration mechanism 301 is disposed such that a plurality of gears are housed in an arcuate space having the optical axis as a center. The arcuate space is formed such that a width size of the space in the radial direction is substantially equal to a width size of zoom motor 300 in the radial direction.

That is, zoom motor 300 and deceleration mechanism 301 are disposed at the position where cut-out portion 100a is formed on fixed frame 100 so that zoom motor 300 and deceleration mechanism 301 can be disposed in the outer peripheral direction about the optical axis as much as possible. With such a configuration, a space can be ensured inside the interchangeable lens so that second lens unit 500 is movable in the inner peripheral side where zoom motor 300 and deceleration mechanism 301 are disposed. Zoom motor 300 and deceleration mechanism 301 are disposed in cut-out portion 100a so as to prevent zoom motor 300 and deceleration mechanism 301 from projecting from the outer peripheral surface of fixed frame 100.

At least some gears of deceleration mechanism 301 other than output gear 301a are disposed at a position where some gears overlap with fixed frame 100 when projected in the radial direction.

Further, zoom motor 300 and deceleration mechanism 301 are arranged substantially concentrically about the optical axis so as to be spaced apart from second lens group G2 in the radial direction with a predetermined distance. The width size of zoom motor 300 is suppressed in the radial direction by forming zoom motor 300 into a shape where a circular cylindrical shape is cut in a D shape at two portions, and the size of deceleration mechanism 301 in the radial direction is set substantially equal to the width size of deceleration mechanism 301. This configuration contributes to reduction of the diameter of the interchangeable lens.

Figure 5:
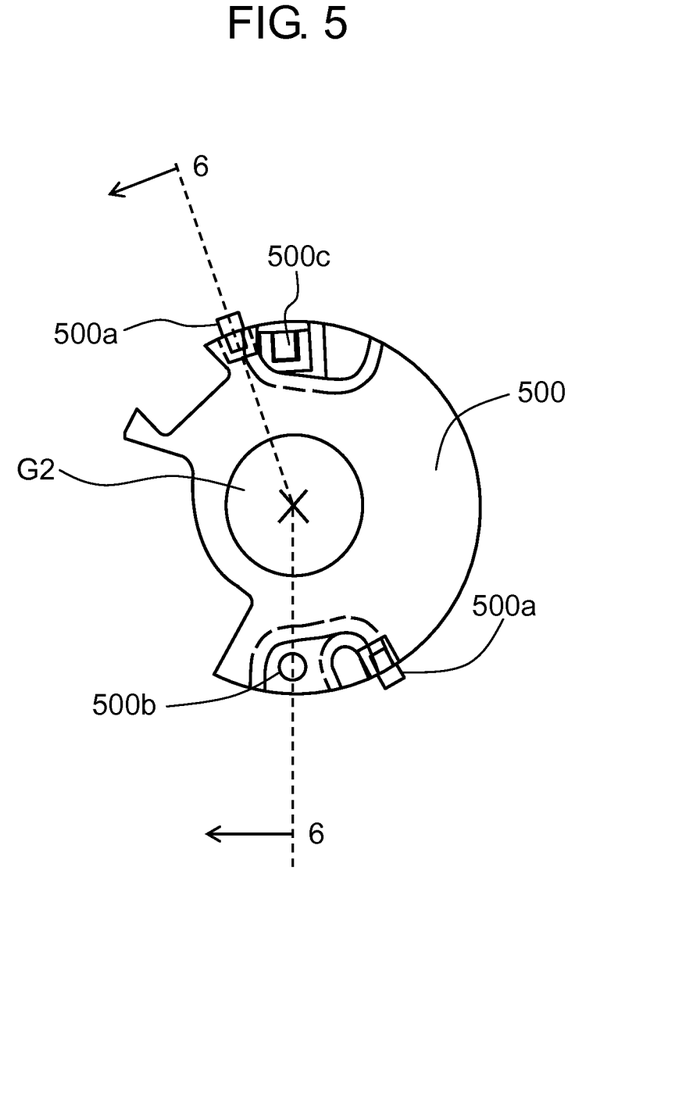
FIG. 5 is a front view of the second lens unit in the first embodiment.

FIG. 5 is a front view of second lens unit 500 including second lens group G2. Second lens unit 500 includes two cam pins 500a, two guide holes 500b, and rotation restricting hole 500c. Two cam pins 500a are mounted on an outer peripheral portion of second lens unit 500, and cam pins 500a are respectively disposed at the position close to guide hole 500b and at the position close to rotation restricting hole 500c in the circumferential direction about the optical axis.

Figure 6:
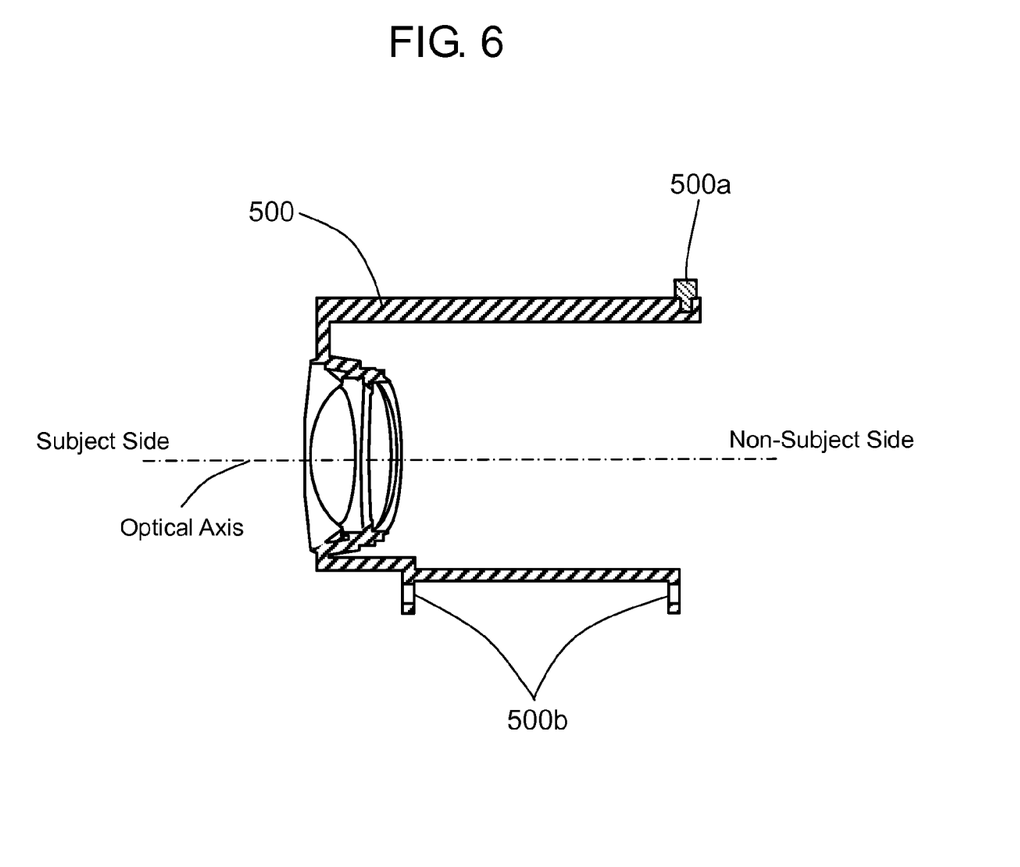
FIG. 6 is a schematic view showing a cross-section taken along line 6-6 in FIG. 5.

FIG. 6 is a schematic view showing a cross-section taken along line 6-6 in FIG. 5. Cam pin 500a is mounted on an end portion of second lens unit 500 on the non-subject side. Further, as shown in FIG. 3, cam pin 500a engages with cam groove 200e from the inner peripheral side of cam barrel 200 closer to the non-subject side than zoom motor 300 and deceleration mechanism 301.

As shown in FIG. 6, two guide holes 500b are provided with a predetermined distance therebetween in the optical axis direction. As shown in FIG. 3, two guide holes 500b engage with guide shaft (main) 401.

Rotation restricting hole 500c engages with guide shaft (sub) 402. Due to such engagement, the rotation of second lens unit 500 about guide shaft (main) 401 is restricted. In this manner, second lens unit 500 is supported movably in the optical axis direction along guide shaft (main) 401.

Figure 7:
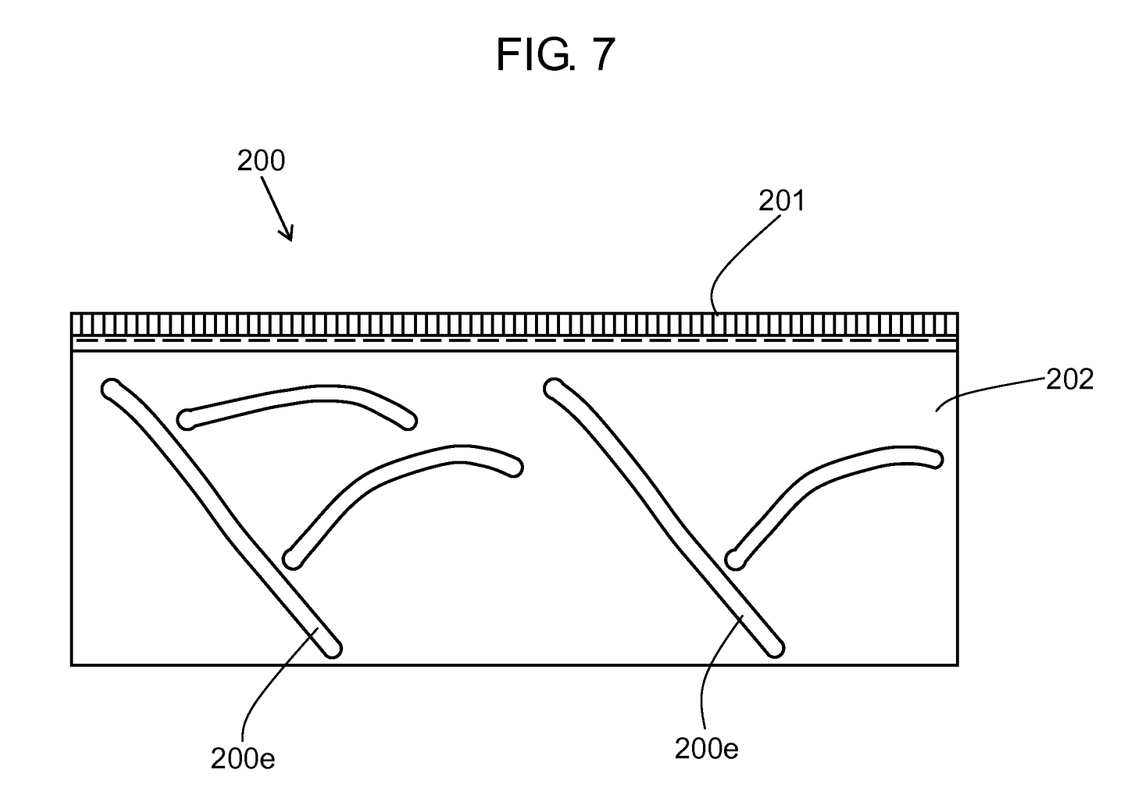
FIG. 7 is a developed view of a cam barrel in the first embodiment.

FIG. 7 is a developed view of cam barrel 200. Cam barrel 200 includes cam barrel body portion 202, and internal gear 201 formed on one end portion of cam barrel body portion 202. A plurality of grooves are formed in cam barrel body portion 202 such that the grooves penetrate cam barrel body portion 202 in the radial direction. Out of these grooves, two cam grooves 200e engage with respective cam pins 500a of second lens unit 500. Due to such engagement, when cam barrel 200 is rotatably driven about the optical axis by a drive force of zoom motor 300, cam pins 500a receive a drive force in the optical axis direction by cam grooves 200e and hence, second lens unit 500 moves in the optical axis direction while being guided by guide shafts 401, 402. Third lens unit 510 having third lens group G3 and fourth lens unit 520 having fourth lens group G4 are also configured to be movable in the optical axis direction by receiving a drive force from the grooves formed in cam barrel 200. In this manner, cam barrel body portion 202 imparts a drive force to a plurality of lens groups by the grooves formed on cam barrel body portion 202 and hence, cam barrel body portion 202 requires strength. Accordingly, it is preferable that cam barrel body portion 202 is made of metal.

With the above configuration, a drive force of zoom motor 300 rotates cam barrel 200 by way of deceleration mechanism 301 and internal gear 201. When cam barrel 200 is rotated, second lens unit 500 moves in the optical axis direction on the inner peripheral side of fixed frame 100 where zoom motor 300 and deceleration mechanism 301 are disposed while being supported on guide shafts 401, 402.

As a result, by disposing zoom motor 300 inside the outer peripheral surface of fixed frame 100, the reduction of the diameter of the interchangeable lens can be realized. Further, the reduction of the diameter of the interchangeable lens can be realized by arranging cam barrel 200 and zoom motor 300 in the optical axis direction. Further, by disposing zoom motor 300 in cut-out portion 100a formed in fixed frame 100, a space can be ensured on the inner peripheral side of the interchangeable lens. Hence, the size of the lenses of the zoom frame such as second lens unit 500 can be increased, whereby a high magnification of the interchangeable lens can be realized. Further, second lens unit 500 is movable on the inner peripheral side of zoom motor 300 and hence, a large movable range can be ensured in the optical axis direction, whereby a high magnification of the interchangeable lens can be realized.

With such a configuration, zoom motor 300 is disposed at a position where zoom motor 300 and the subject side of cam barrel 200 are arranged in the optical axis direction and, at the same time, zoom motor 300 is disposed at the position where zoom motor 300 overlaps with cam barrel 200 when projected in the optical axis direction. Accordingly, it is unnecessary to provide the zoom motor which is a drive part on the outer peripheral side or the inner peripheral side of the cam frame and hence, the reduction of the diameter of the interchangeable lens can be realized.

Cut-out portion 100a is formed in fixed frame 100, and zoom motor 300 and deceleration mechanism 301 are mounted in cut-out portion 100a. Accordingly, it is unnecessary to dispose zoom motor 300 and deceleration mechanism 301 more on an inner side than the inner peripheral surface of the fixed frame and hence, the outer diameter of fixed frame 100 can be reduced. In the first embodiment, a profile of fixed frame 100 is decreased to an extent that the profile of fixed frame 100 approximates a profile of zoom motor 300 in the radial direction.

Figure 8:
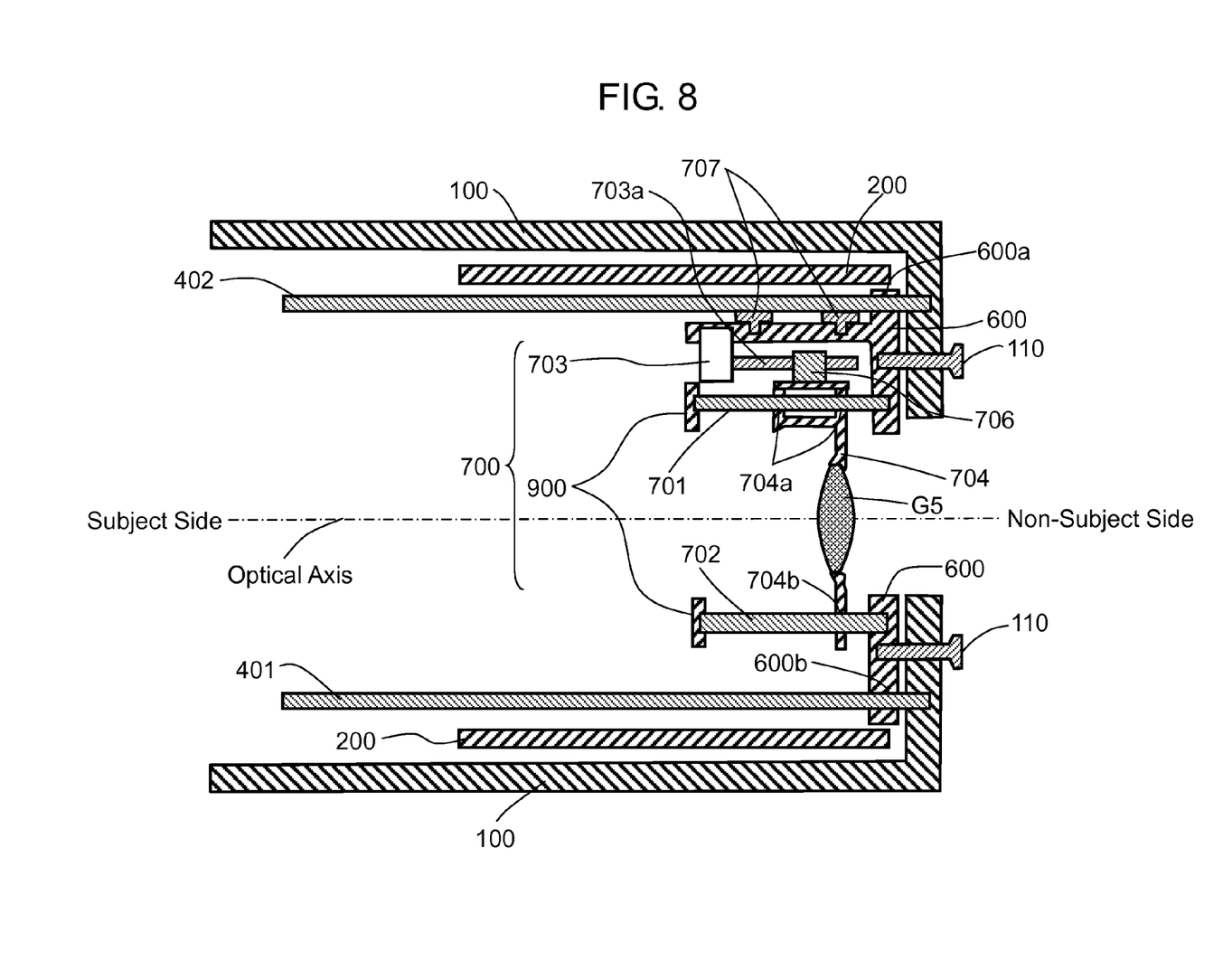
FIG. 8 is a schematic view showing a configuration of a focus unit in the first embodiment.

FIG. 8 is a schematic view showing the configuration of focus unit 700. Focus unit 700 includes: base frame 600, focus guide shafts 701, 702, focus motor unit 703, focus frame 704, fifth lens group G5, and holding plate 900.

End portions of focus guide shafts 701, 702 on the non-subject side are supported on base frame 600, and end portions of focus guide shafts 701, 702 on the subject side are supported on holding plate 900. Focus guide shafts 701, 702 are supported substantially parallel to the optical axis. Holding plate 900 is fixed to base frame 600 by small screws or the like. Base frame 600 and holding plate 900 which support focus guide shafts 701, 702 are one example of the holding member.

Focus frame 704 holds fifth lens group G5, and has two guide holes 704a and rotation restricting hole 704b. Two guide holes 704a are provided spaced apart with a predetermined distance therebetween in the optical axis direction, and engage with focus guide shaft (main) 701. Rotation restricting hole 704b engages with focus guide shaft (sub) 702, and restricts the rotation of focus frame 704 about focus guide shaft (main) 701. Accordingly, focus frame 704 is movably supported in the optical axis direction along focus guide shaft (main) 701. Focus frame 704 which holds fifth lens group G5 is one example of the lens frame.

Rack 706 is mounted on focus frame 704. Rack 706 engages with focus motor unit 703, and transmits a drive force of focus motor unit 703 to focus frame 704. Accordingly, focus frame 704 is driven in the optical axis direction along focus guide shafts 701, 702.

Focus motor unit 703 is mounted on base frame 600 by small screws 707 in the direction orthogonal to the optical axis. Focus motor unit 703 includes screw 703a, and screw 703a is disposed substantially parallel to the optical axis. Rack 706 mounted on focus frame 704 engages with screw 703a. Accordingly, rack 706 is driven in the optical axis direction due to the rotational drive force of screw 703a, and focus frame 704 moves in the optical axis direction integrally with rack 706.

In this manner, focus unit 700 includes: base frame 600, focus guide shafts 701, 702, focus motor unit 703, focus frame 704, fifth lens group G5, and holding plate 900, and thus configuring one unit. Positioning holes 600a, 600b are formed in base frame 600. In a state where guide shafts 401, 402 are fitted into positioning holes 600a, 600b, focus unit 700 is inserted into a barrel portion of fixed frame 100 from the subject side, and is fixed to the bottom portion of fixed frame 100 from the non-subject side by small screws 110. In this manner, as shown in FIG. 8, focus unit 700 is disposed on the inner peripheral side of cam barrel 200.

Next, an assembling method of focus unit 700 and a method of mounting focus unit 700 on fixed frame 100 will be described. One ends of focus guide shafts 701, 702 are mounted and fixed to base frame 600. Then, focus frame 704 mounted with fifth lens group G5 is mounted on focus guide shafts 701, 702. Here, focus guide shaft (main) 701 is inserted into guide hole 704a, and focus guide shaft (sub) 702 is inserted into rotation restricting hole 704b. Next, holding plate 900 is mounted and fixed to the other ends of focus guide shafts 701, 702. Then, focus motor unit 703 is mounted and fixed to base frame 600. Here, screw 703a of focus motor unit 703 engages with rack 706 of focus frame 704. Focus unit 700 is assembled in this manner. Focus motor unit 703 may be mounted before holding plate 900 is mounted.

Next, in a state where guide shafts 401, 402 are fitted into positioning holes 600a, 600b of base frame 600, assembled focus unit 700 is inserted into the barrel portion of fixed frame 100 from the subject side. Then, focus unit 700 is fixed to the bottom portion of fixed frame 100 from a non-subject side (the side opposite to the subject side) by small screws 110. In this manner, mounting of focus unit 700 on fixed frame 100 is completed.

As described above, when focus lens group out of the lens groups of the interchangeable lens is provided on the non-subject side, in an attempt to individually mount, on fixed frame 100, parts constituting focus unit 700, an operation at the position far (deep) from the subject side of fixed frame 100 is necessary and hence, assembling property is extremely bad. Further, when fastening by small screws or the like is performed in the direction not parallel to the optical axis, it is necessary to form holes in portions of fixed frame 100 around the fastening portion and to perform an operation from the outer peripheral side of fixed frame 100. Hence, there arise drawbacks such as lowering of strength of the fixed frame. In view of the above, firstly, focus unit 700 is assembled in an environment where good workability is acquired, and focus unit 700 is mounted on the fixed frame in the direction substantially parallel to the optical axis, thus greatly improving assembling property and enhancing productivity. Further, by performing positioning of focus unit 700 with respect to the fixed frame in a plane orthogonal to the optical axis using guide shafts 401, 402, the eccentric error between fifth lens group G5 and second lens group G2 to fourth lens group G4 can be decreased, thus also realizing improvement in assembling accuracy.

Other Embodiments

The first embodiment has been described above as the example of the technique disclosed in this application. However, the technique of this disclosure is not limited to the first embodiment, and is applicable to other embodiments where a change, a replacement, an addition, an omission, or the like is applied to the first embodiment as appropriate.

Further, the first embodiment also discloses the following lens barrels.

(Note 1)

A lens barrel which receives light from a subject and forms an image by a lens system, the lens barrels including:
a fixed frame which has a cylindrical portion and a bottom portion;
a guide shaft which is disposed on an inner peripheral side of the fixed frame and is fixed to the bottom portion of the fixed frame; and
a lens unit which has a positioning portion to be positioned by the guide shaft, and is fixed to the bottom portion of the fixed frame from an outside by a fixing member.

(Note 2)

The lens barrel according to Note 1, wherein
the lens unit includes:
a first holding member and a second holding member which are arranged in an optical axis direction of the lens system;
a second guide shaft which connects the first holding member and the second holding member to each other; and
a lens frame which holds the lens system and is movably supported on the second guide shaft in the optical axis direction.

(Note 3)

The lens barrel according to Note 2, wherein
the first holding member has the positioning portion, is arranged on a bottom portion side of the fixed frame, and is fixed to the bottom portion of the fixed frame by the fixing member.

(Note 4)

The lens barrel according to Note 2, wherein
the lens unit includes a drive part which drives the lens frame in the optical axis direction, and
the drive part is fixed to the first holding member.

The embodiments have been described above as an example of the technique according to this disclosure. For this purpose, the attached drawings and the detailed description are provided.

Accordingly, the constituent elements described in the accompanying drawings and the detailed description may include not only the constituent elements necessary for overcoming the problems but also constituent elements which are unnecessary for overcoming the problems in order to exemplify the above techniques. Therefore, such unnecessary constituent elements should not be immediately determined to be necessary, for the reason that these unnecessary constituent elements are described in the accompanying drawings and the detailed description.

Further, the above embodiments are merely for exemplifying the techniques according to this disclosure, and therefore, various changes, replacements, additions, omissions, and the like can be made thereto within the scope of the claims and scopes equivalent thereto.

The lens barrel of this disclosure is applicable to an interchangeable lens, a lens barrel of a digital still camera, or the like.

What is claimed is:

1. A lens barrel which receives light from a subject and forms an image by a lens system, the lens barrel comprising:
a fixed frame;
a cam frame disposed on an inner peripheral side of the fixed frame and having at least one cam groove;
a movable frame including a cam pin which engages with the cam groove of the cam frame, and movable in a direction of an optical axis of the lens system; and
a drive part engaging with the cam frame at an end portion of the cam frame, and rotatably driving the cam frame, the drive part and the cam frame being arranged in the direction of the optical axis,
wherein a peripheral end of the drive part furthest from the optical axis is located at a radius L from the optical axis, and the cam frame is disposed within the radius L from the optical axis, and a position of the cam frame overlaps with a position of the drive part when projected in the direction of the optical axis.

2. The lens barrel according to claim 1, wherein a portion of the drive part is disposed at a position where the portion of the drive part and the fixed frame are arranged in the direction of the optical axis.

3. The lens barrel according to claim 1, wherein
the drive part is fixed to the fixed frame, and
the drive part engages with the cam frame from an inside of the cam frame by way of a gear mechanism having a plurality of gears.

4. The lens barrel according to claim 1, wherein the movable frame is movable in the direction of the optical axis, and is movable on an inner peripheral side of the drive part.

* * * * *